UNITED STATES PATENT OFFICE.

MORTIMER J. COHEN, OF NEW YORK, N. Y.; GEORGE COHEN, ADOLPH BRESLAUER, AND HERMAN ASHER, EXECUTORS OF SAID MORTIMER J. COHEN, DECEASED, ASSIGNORS, BY MESNE ASSIGNMENTS, TO SETH B. HUNT, TRUSTEE, OF NEW YORK, N. Y.

PROCESS OF PURIFYING ALCOHOLIC MATERIAL.

1,365,047.     Specification of Letters Patent.     Patented Jan. 11, 1921.

No Drawing.     Application filed June 8, 1918. Serial No. 238,927.

*To all whom it may concern:*

Be it known that I, MORTIMER J. COHEN, a citizen of the United States, and a resident of New York, county of New York, and State of New York, have invented certain new and useful Improvements in Processes of Purifying Alcoholic Material, of which the following is a specification.

This invention relates to process of purifying alcoholic material. While applicable to other alcoholic materials, it may be applied, for example, to the purification of mixtures of alcohols, comprising secondary alcohols, having three or more carbon atoms, produced, for example, by sulfation and hydrolysis of unsaturated hydrocarbon such as olefins and mixtures thereof, herein referred to as olefin material, either in substantially the pure form or comprised in mixtures of saturated and unsaturated hydrocarbons, such as cracked petroleum, shale oil and the like, and which may be either in the liquid form or in the form of gas or vapor, at ordinary temperatures.

Such mixtures of alcohols may be obtained, for example, from acid extract produced by treating olefin material with an extracting agent, such as sulfuric acid.

When sulfuric acid is used as an extracting agent, the treatment is preferably carried out under sulfating conditions, which may comprise the use of somewhat diluted sulfuric acid with cooling, the temperature being preferably adjusted to the strength of acid, low temperatures being preferably utilized with stronger acid, and higher temperatures with weaker acid. Thorough agitation is preferably employed and the acid is preferably entered into the olefin material gradually and preferably in a subdivided state, as in the form of spray. When extraction is carried on under sulfating conditions an acid extract is obtained which is substantially immiscible in residual hydrocarbon material, when present, and may be separated as by means of layer separation. When the olefin material is in the vaporous or gaseous state, it may be contacted with the extracting agent, as sulfuric acid, in various ways, as by counter-current passage through towers containing finely divided refractory material, such as gravel, coke or the like, or by any other equivalent modes whereby the gases and vapors are brought into intimate contact with the extracting agent, as sulfuric acid, preferably in a finely divided state and unsaturated hydrocarbons are extracted thereby in the form of a suitable acid extract.

Upon hydrolysis of acid extract formed in the foregoing or in other ways, mixtures of alcohols, which are principally secondary alcohols, may be obtained which correspond in a general way to the mixtures of unsaturated hydrocarbons present in the hydrocarbon material taken for treatment, though there may be variations from strict or close correspondence, due to the fact that not all the unsaturated hydrocarbons may be extracted, and linking up or breaking off of carbon atoms may occur to some extent, etc. A process of making such alcoholic material or liquid hydrocarbon material is described and claimed in the co-pending application of Carleton Ellis and myself, filed April 25, 1918, Serial No. 230,679.

Such alcoholic material, particularly in the crude state, contains more or less unsaturated hydrocarbons, such as olefins and the like. When treated with nitric acid, as by adding a small quantity of nitric acid to the alcohols, or vice versa, and agitating, these alcohols, even when rectified by ordinary redistillation, exhibit more or less discoloration, and after standing for a short time the mixture usually becomes dark red, and on standing longer, almost black in color. It is desirable in such arts as the photographic and celluloid industries to obtain such alcoholic material in such a state that it will not exhibit discoloration upon such treatment with nitric acid as above referred to, except that perhaps slight discoloration is permitted to some extent upon long standing, and it is an object of the present invention to provide a process by which such alcohols are refined and obtained in such condition that they are not discolored to a substantial extent by addition to nitric acid. Also these alcohols are at least usually slightly colored (straw to deep yellow) and not water-white unless care be taken in producing them, as, for example, by distillation of the crude alcohols in the presence of materials such as an alkali or sodium carbonate. The process of the present invention also produces water-white alcohols from discolored alcohols and may be used for this purpose in the ordinary refining.

One mode of refining this alcoholic material and substantially freeing it from unsaturated hydrocarbons is described and claimed in the co-pending application of myself and said Carleton Ellis, filed April 25, 1918, Serial No. 230,684, and consists in admixing the impure alcoholic material with sulfuric acid of about 1.57 specific gravity, in which the alcohols are soluble and the hydrocarbons substantially insoluble. The hydrocarbons may thus be separated out, as by layer separation, and upon further diluting the acid the alcohols become insoluble therein and may be separately recovered, as by layer separation, or by distillation from the weak acid. These alcohols, when purified in this manner, while they do not exhibit such marked discoloration upon treatment with nitric acid, still, however, exhibit more or less discoloration, particularly when shaken up with nitric acid and allowed to stand for a considerable period.

I have discovered a simple method of purifying these alcoholic materials and obtaining them in such state that little or no discoloration is produced upon adding to nitric acid, even when permitted to stand over long intervals of time. The alcohols are purified for nitric acid test by treatment with sulfuric acid and the purified alcohols separated from the sulfuric acid by distillation or other means, such as washing with water, etc. According to one embodiment of this process the alcoholic material is admixed with a small percentage of sulfuric acid, say about 5%, and distilled, preferably with open fire distillation, and as the distillation proceeds fresh alcoholic material is preferably added so as to keep the proportions of alcohols and of sulfuric acid in the still substantially constant. When treated in this manner, the alcoholic material produced is water-white and exhibits substantially no discoloration effects on treatment with nitric acid. Sulfuric acid of about 1.8 specific gravity in about the proportion of about 5% by volume of the content maintained in the still appears to give best results with this process, though there may be more or less variation either way from this figure, and in fact, as appears hereinafter, adjustment of the strength of acid may take place and reach substantial equilibrium in a manner which is practically automatic. I find that the sulfuric acid may be used in such distillation process almost continuously without renewal for a considerable period without substantial formation of tars and other objectionable bodies. When the treatment is carried on in the manner described there is little or no production of olefins or other unsaturated hydrocarbons accompanying the refined alcoholic material, but should the same be present they may be separated by fractional distillation or by treatment with sulfuric acid of about 1.57 specific gravity, as above referred to, or such refining treatment with sulfuric acid of about this gravity may be resorted to prior to the continuous distillation operation above described.

The maintenance of substantially constant proportions of sulfuric acid and of alcoholic material is desirable in order to obtain satisfactory results. If, for example, the sulfuric acid is mixed with the alcoholic material and it is attempted to distil over the whole body of the material, or a substantial portion thereof, the relative proportion of the acid present increases as the alcohols distil over, and in a short time the dehydrating effect of the sulfuric acid in the presence of heat manifests itself to a substantial extent and substantial quantities of unsaturated hydrocarbons, as olefins and the like, distil over and the material obtained when treated with nitric acid does not appear to be well suited for purposes such as above referred to. While olefins and polymers of unsaturated hydrocarbons are observed to appreciable extent when distillation is carried out in this manner, the alcohols after separation from these impurities, as by distillation or by means of sulfuric acid of about 1.57 specific gravity, also give a good $HNO_3$ test, and the extent to which these olefins and polymers are produced seems to vary considerably with the rate of distillation, seemingly becoming less with increased speed in distillation. However, toward the end of distillation considerable browning and tar formation is produced, which condition substantially never occurs in continuous distillation.

There may, of course, be variations in the precise strength of acid used and in the precise proportions, but I have found that with sulfuric acid of 1.8 specific gravity, acid to the extent of about 5% of the alcoholic material in the still gives the best results. A good way of obtaining proper adjustment of the alcohol to acid is to start with alcohol somewhat in excess of the proportions referred to, and this usually happens where the alcohols contain more or less water, so that the acid is diluted upon addition of the alcohols, and after the material is heated and distillation commences, the material distilled over may be tested from time to time, and when it is found that the alcoholic material coming over no longer exhibits discoloration upon mixing with nitric acid, the level in the still may be noted and the addition of alcohols begun at this point, care being taken thereafter to add alcohols at the rate they distil over so as to maintain a substantially constant level in the still. The alcohols refined in substantially the foregoing manner appear to undergo substantially no decomposition to olefins or polymers, especially when the distillation with $H_2SO_4$ is carried out with substantial rapidity. Means of accelerating the rapidity of distillation, or lowering the boiling point, may be resorted to, if desired, as distillation under vacuum or the like.

An alternative method which I have found to give good results, more especially where batch treatment is desired, consists in providing a still charge substantially as described containing the alcohols and about 5% of sulfuric acid, and carrying out the distillation, at least in part, by means of live steam admitted within the still. In this way the strength of acid does not increase progressively as the distillation proceeds and dehydration is substantially avoided. The preliminary adjustment of conditions may be obtained substantially as when alcohols are added, tests being made until the alcohols which come over are of the desired good quality, indicating that the proper proportion of acid to alcohols has been reached, after which the live steam may be admitted into the still.

It is to be understood that the particular procedure herein described is by way of illustration only and for affording a clear understanding of my invention, and not for limitation of the invention, and that various changes and modifications may be resorted to within the scope of my claims and without departing from my invention.

I claim:

1. The process of purifying alcoholic material which consists in distilling in the presence of a small quantity of sulfuric acid.

2. The process of purifying alcoholic material which consists in treating with sulfuric acid, and separating the purified alcoholic material from the acid.

3. The process of purifying alcohols which consists in distilling with live steam in presence of a small proportion of sulfuric acid.

4. The process of purifying alcoholic material substantially corresponding to unsaturated hydrocarbons of cracked petroleum material which consists in distilling such alcoholic material in the presence of a small proportion of sulfuric acid, and adding fresh quantities of alcoholic material as the same distils over.

5. The process of purifying alcoholic bodies comprising secondary alcohols which consists in distilling such alcoholic material in the presence of about 5% by volume of sulfuric acid, and supplying fresh alcoholic material as the same distils over.

6. The process of purifying alcoholic bodies comprising secondary alcohols which consists in distilling such alcoholic material in the presence of about 5% by volume of sulfuric acid of about 1.8 specific gravity, and supplying fresh alcoholic material as the same distils over.

7. The process of purifying alcoholic bodies comprising secondary alcohols which consists in bringing such alcoholic material into and out of contact with a volume of sulfuric acid of about 1.8 specific gravity, and equal to about 5% of the alcoholic material.

8. The process of purifying alcoholic material comprising secondary alcohols which comprises continuously distilling such alcohols in the presence of sulfuric acid while maintaining the proportion of alcohol to acid substantially constant.

9. The process of producing alcoholic material comprising secondary alcohols which do not exhibit substantial discoloration with nitric acid which comprises the steps of distilling such alcoholic material in the presence of about 5% of sulfuric acid by volume, and supplying fresh alcoholic material as the same distils over to keep the still level substantially constant and to maintain continuously substantially the same proportion of acid and alcohol.

10. The process of producing alcoholic material comprising secondary alcohols which will not exhibit substantial discoloration on treatment with nitric acid which consists in introducing into a still a quantity of such alcoholic material together with sulfuric acid of about 1.8 specific gravity substantially less than 5% by volume of the alcoholic material, distilling over until the alcoholic material which comes over does not exhibit discoloration on treatment with nitric acid, and thereafter maintaining the supply of alcoholic material at a substantially constant level during subsequent distillation.

In testimony that I claim the foregoing, I hereto set my hand, this 5th day of June, 1918.

MORTIMER J. COHEN.